United States Patent [19]

Drexler et al.

[11] Patent Number: 4,889,979

[45] Date of Patent: Dec. 26, 1989

[54] METHOD FOR EXTENDING LIFE OF OPTICALLY RECORDED INFORMATION

[75] Inventors: Jerome Drexler, Los Altos Hills; Eric W. Bouldin, Atherton, both of Calif.

[73] Assignee: Drexler Technology Corporation, Mountain View, Calif.

[21] Appl. No.: 896,991

[22] Filed: Aug. 15, 1986

[51] Int. Cl.⁴ .................. G06K 5/00; G11B 23/50; G11B 7/28

[52] U.S. Cl. .................. 235/454; 235/487; 369/54; 369/58; 369/84

[58] Field of Search .......... 369/54, 58, 84, 83, 369/32, 59; 235/487, 488, 454, 494, 380, 375, 376

[56] References Cited

U.S. PATENT DOCUMENTS

| | | | |
|---|---|---|---|
| 3,720,923 | 3/1973 | Chen et al. | 340/173 |
| 4,360,728 | 11/1982 | Drexler | 235/462 |
| 4,545,044 | 10/1985 | Satoh et al. | 369/58 |
| 4,575,827 | 3/1986 | Kulakowski | 365/230 |
| 4,582,986 | 4/1986 | Stockburger et al. | 235/454 |
| 4,638,472 | 1/1987 | Ogata et al. | 369/54 |
| 4,648,085 | 3/1987 | Shimonou | 369/54 |

FOREIGN PATENT DOCUMENTS

| | | | |
|---|---|---|---|
| 54-68205 | 1/1979 | Japan | 369/58 |
| 59-139145 | 8/1984 | Japan | 369/54 |
| 60-214076 | 10/1985 | Japan | 235/380 |
| 60-239927 | 11/1985 | Japan | 369/54 |

Primary Examiner—Alan Faber
Assistant Examiner—Robert A. Weinhardt
Attorney, Agent, or Firm—Thomas Schneck

[57] ABSTRACT

A method for extending the life of information recorded on an optical storage medium, such as direct-read-after-write laser recording material. Information and an index are recorded on the medium. When the optical contrast ratio of the recording begins to deteriorate, when a specified error rate in reading data bits occurs, or after a predetermined time elapses, the information is re-recorded at another location on the medium and a new index entry is added.

5 Claims, 2 Drawing Sheets

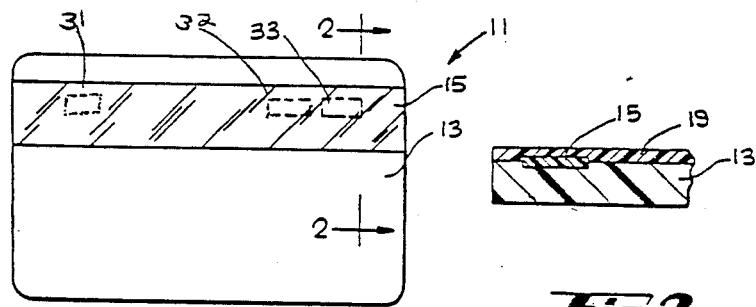
Fig. 1
Fig. 2
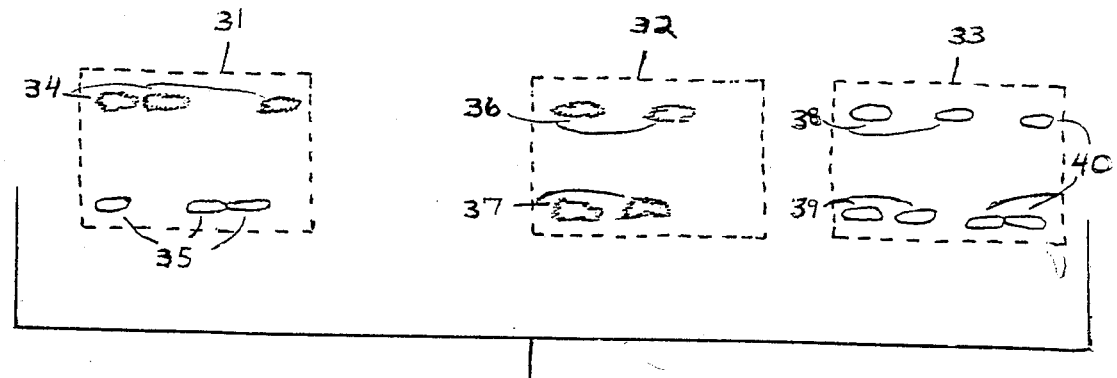
Fig. 3

METHOD FOR EXTENDING LIFE OF OPTICALLY RECORDED INFORMATION

DESCRIPTION

1. Technical Field

The invention relates to optical information storage, and more particularly to a method for extending the life of optically recorded information.

2. Background Art

Chen, in U.S. Pat. No. 3,720,923, teaches a beam addressed optical mass memory having an alterable memory medium which exhibits a change in its optical properties as a function of time or as a function of write-rewrite cycles. A reference bit is recorded on the memory medium, and one or more information bits are similarly recorded. Over the course of multiple write-rewrite cycles, the alterable reference bit is subjected to a number of write-rewrite cycles which is essentially equal to the average number of write-rewrite cycles to which any one of the information bits is subjected. Therefore, the reference bits exhibit the same changes in optical properties as a result of multiple write-rewrite cycles as do the information bits.

In Chen's invention, information is read by directing a light beam to the reference bit, which has a known state (i.e. recorded or not recorded), and then to the information bits. A detector produces a reference signal indicative of the intensity of the light beam received from the reference bit and produces information signals indicative of the intensity of the light beam from each of the information bits. The reference signal is temporarily stored in a reference channel, and each of the information signals is temporarily stored in an information channel. Comparison of the reference channel with the information channels permits reading of the information recorded on the medium.

Chen teaches use of an alterable memory medium. Information previously recorded on the medium is replaced with new information, and a new reference bit recorded at the same time as the new information. This method for compensating for deterioration of data quality has several limitations. First, the time period over which the information may be read is inherently limited by the deterioration of the information bits. Use of a reference bit compensates for some deterioration, but eventually deterioration of the reference bits will cause the information bits to become unreadable. This problem becomes more significant as the user seeks to preserve information over longer time periods. Second, because the medium used by Chen is alterable, previously stored information is obliterated when new information is written over it in a rewrite cycle. If the new information is related to the old information, the historical evolution of the information is lost. Third, use of a reference bit requires keeping a record of the status of the reference bit (i.e. whether it is recorded or blank). Since the quality of recording on the medium deteriorates over time and over write-rewrite cycles, the record of the reference bit's status cannot be stored on the optical memory medium; it must be stored separately and checked prior to reading the optical memory medium.

Kulakowski, in U.S. Pat. No. 4,575,827, teaches a method for self-archiving data recording. The data is non-delete recorded, with a directory (index) that grows with each recording such that all previous recordings related to particular files or data sets are printed in the directory. Each directory entry is identified by file or data set name and has one field for each data segment currently a part of the file or data set. Each field of the directory has a pointer to the data to which it corresponds, regardless of when the data was recorded. Each time a file or data set is updated, only that portion which is changed is updated. Therefore, each record directory entry will point to data which is the current data but which may have been recorded in the record medium at diverse times.

The directory method taught by Kulakowski reduces the amount of recorded media necesary to preserve a historical record of a data set. Examination of the entire record of the data set is necessary to establish its current contents.

DISCLOSURE OF THE INVENTION

It is the object of the present invention to devise a method for extending the life of optically recorded information. Another object is to permit reading of the information without use of a reference data bit, since the quality of such a bit is susceptible to deterioration. It is also an object of the invention to index on the medium the date the most recent information is recorded and the location of such information on the medium.

It is a further object of the invention to preserve an historical record of the information by rewriting the full information record when deterioration of the quality of the recording makes rewriting necessary.

These objects have been met with a method that involves periodically checking the information on, or index of, an optical storage medium. The date and location on the medium of the most recently rewritten information is indexed on the medium, either with the information or in a separate location. If the quality of the recorded information or the index has deteriorated, or if a predetermined period has passed since the information and index were recorded, the information and new index information are rewritten at other locations on the medium. Each time the information is rewritten, the full record is reproduced, preserving an historical record of the information in one location on the medium. Since the information is rewritten before it has deteriorated significantly, the data bits on the medium may be read easily without use of reference bits to calibrate the detection means.

BRIEF DESCRIPTION OF THE DRAWINGS

FIG. 1 is a plan view of one side of a data card having an optical information storage medium.

FIG. 2 is a partial side sectional view taken along lines 2—2 in FIG. 1.

FIG. 3 is a detail of optical writing on portions of the optical information storage medium strip illustrated by dashed lines in FIG. 1.

BEST MODE FOR CARRYING OUT THE INVENTION

Figure 4:
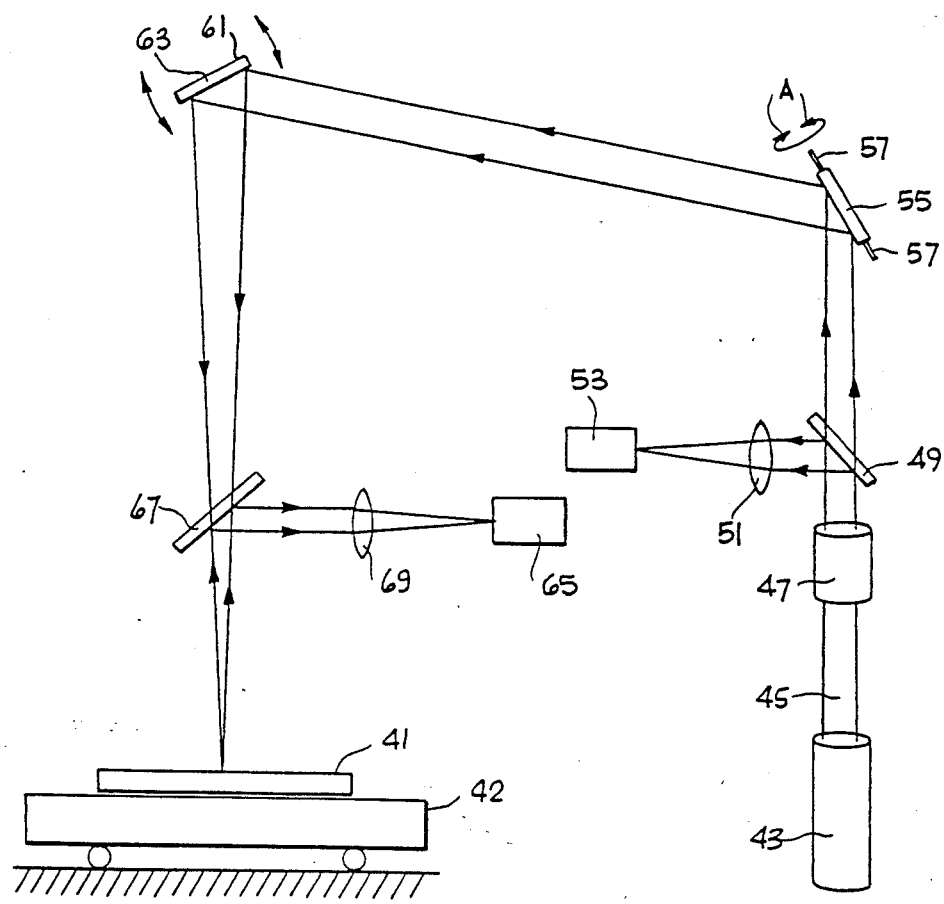
FIG. 4 is a plan view of an apparatus for reading and writing on the optical information storage medium strip illustrated in FIG. 1.

With reference to FIGS. 1 and 2, a data card 11 is illustrated. The card's base 13 carries an optical information storage medium strip 15. Construction of such a data card is described in U.S. Pat. Nos. 4,542,288 and 4,544,835, both assigned to the assignee of the present invention. The data card has a size common to most credit cards, approximately 54 mm wide and approximately 85 mm long. The dimensions of the data card are not critical, nor must the base be rectangular. The function of the base is to support the optical information storage medium strip. The strip is 16 mm to 35 mm wide and extends the length of the card. Alternatively, the strip may have other sizes and orientations. The strip is relatively thin, approximately 100–500 microns, although this is not critical. The strip may be applied to the card by any convenient method which achieves flatness. The strip is adhered to the card with an adhesive and covered by a transparent laminating sheet 19 which serves to keep strip 15 flat, as well as protecting the strip from dust and scratches. Sheet 19 is a thin, transparent plastic sheet laminating material or a coating, such as a transparent lacquer. The material is preferably made of polycarbonate plastic.

The high resolution optical information storage medium which forms strip 15 may be any of the recording materials which have been developed for use as direct-read-after-write (DRAW) optical information storage media. Typical optical information storage media are described in U.S. Pat. Nos. 4,314,260, 4,298,684, 4,278,758, 4,278,756, and 4,269,917, all assigned to the assignee of the present invention. The optical information storage medium which is selected should be compatible with the optical source which is used for writing on it. Some materials are more sensitive than others at certain wavelengths. Good sensitivity to near infrared light (approximately 600 nm to 900 nm) is preferred because near infrared is affected less than visible light by scratches and dirt on the transparent laminating sheet. The selected recording materials should have a favorable signal-to-noise ratio and form high contrast data bits with the read/write system with which it is used. Preferably, the material should not rapidly lose data when subjected to temperatures of about 122° F. (50° C.) for long periods. The material should also be capable of recording at speeds of at least several thousand bits/sec. This generally precludes the use of materials that require a long heating time or that rely on slow chemical reactions in the presence of heat, which may permit recording of only a few bits/second. Data is recorded by forming spots in the optical information storage medium, thereby altering the optical characteristics (reflectivity and/or transmissivity) in the data spot. Data is read by detecting the contrast between the optical characteristics of unrecorded areas and the recorded spots. Contrast ratios of reflectivity or transmissivity of at least two-to-one are preferable for sufficient contrast for reading. Greater contrast is preferred. For example, if a reflective medium is used, reflectivity of the strip field of about 50% is preferred with reflectivity of a spot in the reflective field being less than 20%, thus creating a contrast ratio of greater than two-to-one. The optical contrast ratio of the data spots to unrecorded data areas can be changed either by increasing or decreasing the transmissivity or reflectivity of the medium.

With reference to FIG. 3, a magnified view of optical writing on the optical information storage medium strip may be seen. The blocks in FIG. 3 correspond to the blocks outlined with dashed lines 31, 32, and 33 in FIG. 1. The oblong spots 38 in box 33 correspond to freshly recorded data spots. These oblong spots are aligned in a path and have generally similar dimensions. The spots are generally circular or oval in shape with the axis of the oval parallel to the lengthwise dimension of the strip. A second group of spots 39 is shown aligned in a second path. The spots 39 have similar dimensions to the spots 38. The spacing between paths is not critical, except that the optics of the readback system should be able to easily distinguish between paths.

The information data spots 36 and 37 shown in block 32 correspond to information spots the quality of which has deteriorated. Deterioration of the data spots can be due to the passage of time or to exposure to extreme conditions of heat and/or humidity. As the data spots deteriorate, the optical contrast ratio of the spots with the surrounding unrecorded medium decreases, causing the reading of the information recorded in the data spots to become more difficult.

Unexpectedly, the recording ability of the optical information storage medium does not deteriorate over time or exposure to extreme conditions, or at least does not deteriorate to the same extent as the data spots. New information may be written on the medium with an optical contrast ratio similar to that obtained when the medium is new. Thus, re-recording data spots which have deteriorated (i.e. for which the optical contrast ratio has decreased) permits information to be stored for a longer lifetime.

The block represented by the dashed line 31 corresponds to an index of information recorded on strip 15. Index data spots 34 specify the date and location on the card of the data spots in block 32. Alternatively, these index data spots could be recorded in block 32 instead of in a separate location. As with the data spots in block 32, the quality of the index data spots 34 has deteriorated. When the information recorded in block 32 deteriorates, it must be rewritten to increase the optical contrast ratio. In order to determine when such rewriting is necessary, the index data spots 34 which correspond to block 32 are periodically checked (for example, once a year) for their optical contrast ratio. A measurement of optical contrast between a data spot and the surrounding field indicates deterioration. When optical contrast falls below a defined level, say below 1.5 to 1.0, data is rewritten. The minimum acceptable optical contrast ratio varies with the optical reader used.

Another method of determining when to rewrite information uses the error rate in reading the data spots. For example, up to two bits of every 10-bit byte can be lost and all of the information recovered, provided that an error correction code such as the Reed-Solomon interleaved error code is utilized (as used in the audio compact disc). In this example, the information could be rewritten when the error rate reached 10%. This conservative approach would ensure preservation of all of the information. Alternatively, the data spots can be rewritten after a predetermined period, without a check of their optical contrast ratio. A predetermined period of one year should ensure preservation of the information, even if the medium is subject to severe environmental stress.

If the optical contrast ratio is nearing the minimum acceptable ratio for accurately reading the information stored in the data spots, if the error rate is reaching the maximum rate for accurately reading the information stored in the data spots, or if the predetermined time for rewriting has been reached, a signal is sent to the controls (not shown) of the optical read/write device, and the data spots are rewritten in a previously unrecorded portion of the card. Such rewriting may be accomplished by reading the information data spots, storing the information in a temporary memory such as a semiconductor memory or a magnetic tape or disk (not shown), and then rewriting the information held in the temporary memory at another location on the card. Alternatively, if a system using two radiation sources (described below) is used, the information can be read and rewritten without temporary storage. Information data spots 38 and 39 in block 33 represent freshly rewritten data spots corresponding to deteriorated data spots 36 and 37 in block 32. Information data spots 40 in block 33 represent new information added to the information from block 32, updating the earlier recorded information. New index data spots 35 in block 31 specify the date and location of the newly written data spots in block 33.

Presently, in optical information storage technology, data spot tracks which are separated by only a few microns may be resolved. The spacing imperative to the spots along each path is selected for easy decoding. For example, oval spots of the type shown can be clustered and spaced in accord with self-clocking bar codes. The spots illustrated in FIG. 3 have a recommended size of approximately 5 microns by 20 microns, or circular spots 5 microns or 10 microns in diameter. Generally, the largest dimension of a spot should be less than 50 microns. In the preferred embodiment the largest dimension would be less than 50 microns. Of course, to offset lower densities for larger spots, the size of the strip 15 could be expanded to the point where it covers a large extent of the card. In FIG. 1, the laser recording strip could completely cover the card.

In FIG. 4, a side view of the lengthwise dimension of a card 41 is shown. The card is usually received in a movable holder 42 which brings the card into the optical beam trajectory. A laser light source 43, preferably a pulsed semiconductor laser of near infrared wavelength (approximately 600 nm to 900 nm) emits a beam 45 which passes through collimating and focussing optics 47. The beam is sampled by a beam splitter 49 which transmits a portion of the beam through a focusing lens 51 to a photodetector 53. The detector 53 confirms optical writing and is not essential. The beam is then directed to a first servo controlled mirror 55 which is mounted for rotation along the axis 57 in the direction indicated by the arrows A. The purpose of the mirror 55 is to find the lateral edges of the optical information storage medium in a coarse mode of operation and then in a fine mode of operation identify data paths which exist predetermined distances from the edges.

From mirror 55, the beam is directed toward mirror 61. This mirror is mounted for rotation at pivot 63. The purpose of mirror 61 is for fine control of motion of the beam along the length of the card. Coarse control of the lengthwise position of the card relative to the beam is achieved by motion of movable holder 42. The position of the holder may be established by a linear motor adjusted by a closed loop position servo system of the type used in magnetic disk drives. During its manufacture the card may be prerecorded with a preinscribed pattern containing servo tracks, timing marks, program instructions, and related functions. These positioning marks can be used as a reference for the optical recording system to record or read data at particular locations. U.S. Pat. No. 4,304,848 describes how formatting may be done photolithographically. Formatting may also be done using optical recording or surface molding of the servo tracks, having marks, programming and related functions. Dil, in U.S. Pat. No. 4,209,804, teaches a type of surface molding. Reference position information may be prerecorded on the card so that position error signals may be generated and used as feedback in motor control. Upon reading one data path, the mirror 55 is slightly rotated. The motor moves holder 41 lengthwise so that the path can be read, and so on. Light scattered and reflected from the spots contrasts with the surrounding field where no spots exist. The beam should deliver sufficient pulse energy to the surface of the optical information storage medium to create spots. Typically, 5-20 milliwatts is required, depending on the storage medium. A 20 milliwatt semiconductor laser, focussed to a five micron beam size, records at temperatures of about 200° C. and is capable of creating spots in less than 25 microseconds. The wavelength of the optical source should be compatible with the recording material. In the read mode, power is lowered to about 5% to 10% of the record power. Alternatively, a system having two radiation sources can be used. A laser is used as the first source, for recording. The second radiation source, for reading, can be a second laser, or it can be a noncoherent source, such as a light emitting diode.

Optical contrast between a spot and surrounding field are detected by light detector 65 which may be a photodiode. Light is focussed onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to spots. These signals are processed and recorded for subsequent display as useful information regarding the information recorded on the card.

I claim:

1. A method for extending the life of optically recorded information comprising,
   recording information on a non-delete optical information storage medium by creating information data spots with a light beam,
   in an index positioned on the medium, indexing the information recorded by creating index data spots with the light beam,
   determining periodically the quality of one of the index data spots and the information data spots to determine the deterioration of the data spots from a comparison of change in an optical property of the data spots relative to the optical property of the unrecorded medium,
   duplicating the information data spots that have deteriorated, by re-recording the previously recorded information on the medium, the timing of the duplication being a function of the deterioration of the data spots, and
   indexing the re-recorded information on the medium.

2. A method for extending the life of optically recorded information comprising,
   recording information on a non-delete optical information storage medium by creating information data spots with a first beam,
   in an index on the medium, indexing the recorded information by creating index data spots with the first beam, said index data spots identifying the recording date and location on the medium of the information data spots to which said index data spots correspond,
   determining that re-recording of the information data spots is required by optically reading the index data spots periodically with a second beam and determining that the optical contrast ratio of the index data spots to the unrecorded medium has decreased to the extent that further deterioration will make said index data spots and the corresponding information data spots unreadable, reading the information data spots with the second beam and re-recording the information at another previously unrecorded location on the medium by creating new information data spots with the first beam, and in the index on the medium, indexing the recorded information by creating new index data spots with the first beam, said new index data spots identifying the date and location on the medium of the new information data spots to which the new index data spots correspond.

3. A method for extending the life of optically recorded information comprising, recording information on a non-delete optical information storage medium by creating information data spots with a first beam, in an index on the medium, indexing the recorded information by creating index data spots with the first beam, said index data spots identifying the recording date and location on the medium of the information data spots to which said index data spots correspond, determining that re-recording of the information data spots is required by optically reading the index data spots periodically with the second beam and determining that the error rate has increased to the extent that further increase will render the errors in the index data spots and the corresponding information data spots uncorrectable, reading the information data spots with a second beam and re-recording the information at another previously unrecorded location on the medium by creating new information data spots with the first beam, and in the index on the medium, indexing the rerecorded information by creating new index data spots with the first beam, said new index data spots identifying the date and location on the medium of the new information data spots to which the new index data spots correspond.

4. A method for extending the life of optically recorded information comprising, recording information on a non-delete optical information storage medium by creating information data spots with a laser, in an index on the medium, indexing the recorded information by creating index data spots with the laser, said index data spots identifying the recording data and location on the medium of the information data spots to which said index data spots correspond, determining that duplication of the information data spots is required by optically reading the index data spots periodically with the laser and determining that the optical contrast ratio of the index data spots to the unrecorded medium has decreased to the extent that further deterioration will make the index data spots and the corresponding information data spots unreadable, reading the information data spots with the laser, storing the information contained in said information data spots in a temporary memory, and duplicating the information at another previously unrecorded location on the medium by creating new information data spots with the laser, and in the index on the medium, indexing the duplicated information by creating new index data spots with the laser, said new index data spots identifying the date and location on the medium of the new information data spots to which the new index data spots correspond.

5. A method for extending the life of optically recorded information comprising, recording information on a non-delete optical information storage medium by creating information data spots with a laser, in an index on the medium, indexing the recorded information by creating index data spots with the laser, said index data spots identifying the recording date and location on the medium of the information data spots to which said index data spots correspond, determining that duplication of the information data spots is required by optically reading the index data spots periodically with a laser and determining that the error rate has increased to the extent that further increase will render the errors in the index data spots and the corresponding information data spots uncorrectable, reading the information data spots with the laser, storing the information contained in said information data spots in a temporary memory, and duplicating the information at another previously unrecorded location on the medium by creating new information data spots with the laser, and in the index on the medium, indexing the duplicated information by creating new index data spots with the laser, said new index data spots identifying the date and location on the medium of the new information data spots to which the new index data spots correspond.

* * * * *

UNITED STATES PATENT AND TRADEMARK OFFICE
CERTIFICATE OF CORRECTION

PATENT NO. : 4,889,979

DATED : December 26, 1989

INVENTOR(S) : Jerome Drexler et al.

It is certified that error appears in the above-identified patent and that said Letters Patent is hereby corrected as shown below:

Claim 4, column 7, line 53, "data" should read - - date - -.

Signed and Sealed this

Fourth Day of December, 1990

Attest:

HARRY F. MANBECK, JR.

*Attesting Officer*  *Commissioner of Patents and Trademarks*